United States Patent [19]
Fouts

[11] Patent Number: 5,460,247
[45] Date of Patent: Oct. 24, 1995

[54] VEHICLE BRAKE HOSE SYSTEM WITH WHIP DAMPENER

[75] Inventor: Robert E. Fouts, Rancho Palos Verdes, Calif.

[73] Assignee: Earl's Supply Company, Long Beach, Calif.

[21] Appl. No.: 144,732

[22] Filed: Oct. 28, 1993

[51] Int. Cl.$^6$ .................................................... F16D 55/00
[52] U.S. Cl. .................... 188/71.1; 138/125; 138/DIG. 3; 248/60
[58] Field of Search .................... 188/352, 382, 188/71.1, 381, 152; 138/110, 103, 107, 123, 124, 125, DIG. 3; 181/208; 384/1, 44.1; 24/455; 81/9.3; 248/230, 231, 231.1, 60, 62, 56, 75, 80, 635, 608

[56] References Cited

U.S. PATENT DOCUMENTS

| | | | |
|---|---|---|---|
| 2,787,289 | 4/1957 | Press | 138/DIG. 3 |
| 4,402,346 | 9/1983 | Cheetham | 138/DIG. 3 |
| 4,655,614 | 4/1987 | Schott | 384/441 |
| 4,813,517 | 3/1989 | Mann | 188/152 |
| 4,930,733 | 6/1990 | Logsdon | 248/56 |
| 4,991,695 | 2/1991 | Hellmer | 188/71.1 |

Primary Examiner—Robert J. Oberleitner
Assistant Examiner—Clifford T. Bartz
Attorney, Agent, or Firm—Poms, Smith, Lande & Rose

[57] ABSTRACT

A hose system for brakes of vehicles adapted to replace the flexible hose of a vehicle that extends from the pre-existing brake caliper of a vehicle through a bracket and to the pre-existing brake master cylinder of the vehicle. The system includes a flexible hose of stainless steel braid protected extruded Teflon material having a whip dampening member mounted on the hose receivable in the pre-existing bracket of the vehicle.

7 Claims, 2 Drawing Sheets

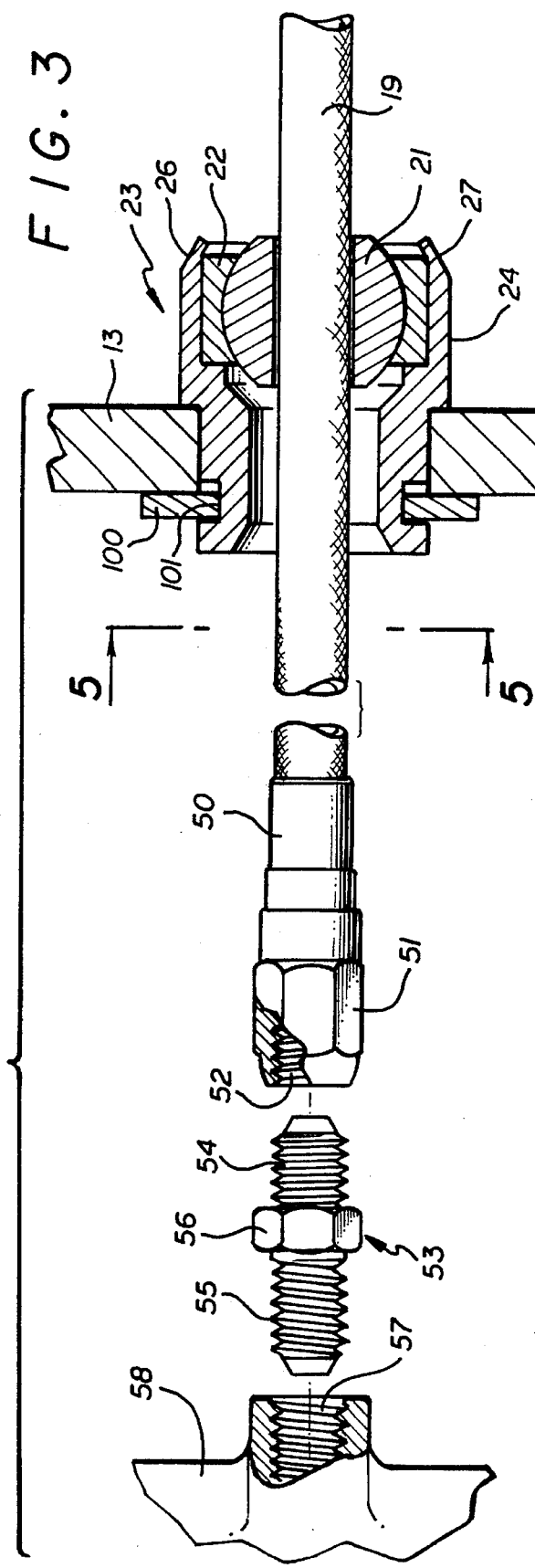
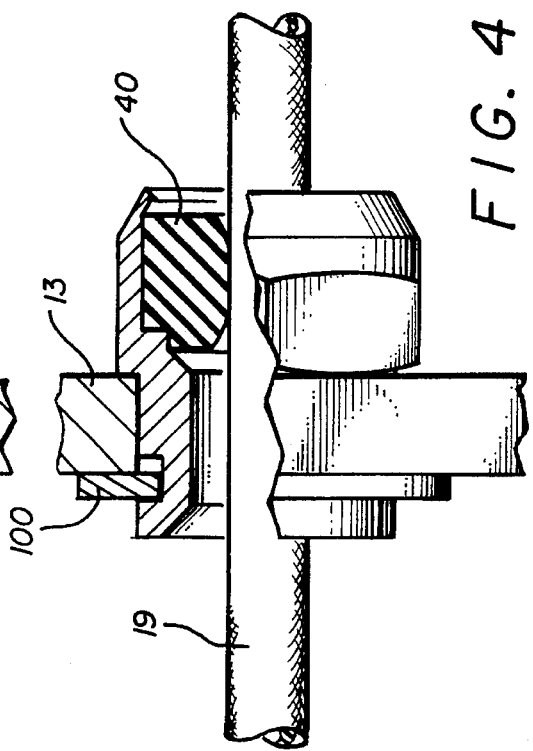
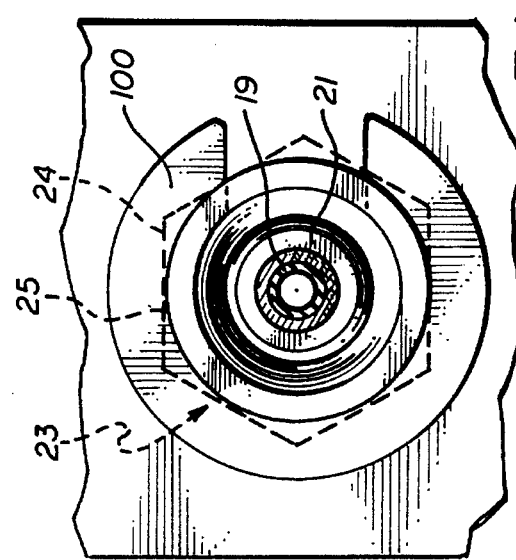

VEHICLE BRAKE HOSE SYSTEM WITH WHIP DAMPENER

BACKGROUND OF THE INVENTION

1. Field of the Invention

The invention relates to vehicle braking systems; and, more particularly, to a vehicle brake hose system with a whip dampener for eliminating pulsation and uneven wear of vehicle brake systems that meets Department of Transportation standards.

2. Description of the Prior Art

In order to accommodate necessary relative motion between the sprung and unsprung masses of a motor vehicle (i.e., the chassis and suspended wheels), suspension mounted hydraulic brakes are connected to the chassis by flexible hydraulic hoses. These hoses are typically fabricated from fabric braid reinforced elastomers.

Standard original equipment of such fabric reinforced flexible brake hoses on motor vehicles expand or swell to some extent under pressure, thus using up some of the available brake pedal travel and resulting in a relatively "soft" feel to the brake pedal. This soft feel reduces the precision of brake modulation by the driver. Both of these conditions are unacceptable in racing cars. For more than a quarter of a century, racing cars have been equipped with flexible brake hoses of stainless steel braid protected extruded Teflon. These hoses exhibit considerably less expansion under pressure resulting in a higher and firmer brake pedal and a larger margin of safety in the case of more even friction pad wear and more precise brake modulation.

Despite an outstanding record of performance and reliability in racing and off highway use, these high performance flexible brake hoses have not been certified for highway use because they have been unable to comply with the Basic Motor Vehicle Safety Standard 106, Section 56.3 (whip resistance test) set by the U.S. Department of Transportation (DOT).

Thus, efforts made in the past to substitute stainless steel braid protected Teflon flexible hose for the original equipment elastomeric brake hose on vehicles has usually led to fatigue failure of the protective braid at the end of the crimp or swedged collar or socket of the hose end fitting followed by fatigue failure of the Teflon hose and resultant loss of pressure. Applicant is not aware of any substitute that is able to pass the aforementioned whip resistance test required by DOT for highway use vehicles.

There is thus a need for a flexible brake hose assembly that accommodates necessary relative motion between the chassis and wheels of a vehicle and passes all aspects of the whip resistance test required by the DOT.

SUMMARY OF THE INVENTION

It is an object of this invention to provide a flexible brake hose assembly that utilizes stainless steel braid protected Teflon hose and accommodates necessary relative motion between the chassis and wheels of a vehicle and passes all aspects of the whip resistance test required by the DOT.

It is a further object of this invention to carry out the foregoing object using the pre-existing bracket on a vehicle between the chassis and wheels.

It is still further an object of this invention to provide an improved flexible brake hose assembly for a vehicle that results in less uneven wear of the brake pads of the vehicle.

It is another object of this invention to provide an improved flexible brake hose assembly for a vehicle that eliminates swelling of flexible hoses of antilock brake systems, thereby reducing pulsation.

It is still a further object of this invention to provide an improved flexible brake hose assembly for a vehicle that eliminates or reduces the soft brake pedal effect encountered in present brake hose assemblies.

These and other objects are preferably accomplished by providing an improved hose system for brakes of vehicles adapted to replace the flexible hose of a vehicle that extends from the pre-existing brake caliper of a vehicle through a bracket and to the pre-existing brake master cylinder of the vehicle. The system includes a flexible hose having a whip dampening member mounted on the hose receivable in the pre-existing bracket of the vehicle. The member is preferably slidably mounted and the hose preferably includes a stainless steel braid protected extruded Teflon flexible hose.

BRIEF DESCRIPTION OF THE DRAWING

FIG. 3 is an elevational sectional view, partly exploded, of a portion of the apparatus of FIG. 2 where it passes through the vehicle bracket;

FIG. 4 is a view similar to FIG. 3 showing a modification of the whip dampening means of the invention; and FIG. 5 is a view taken along lines 5—5 of FIG. 3.

DESCRIPTION OF THE PREFERRED EMBODIMENT

Figure 1:
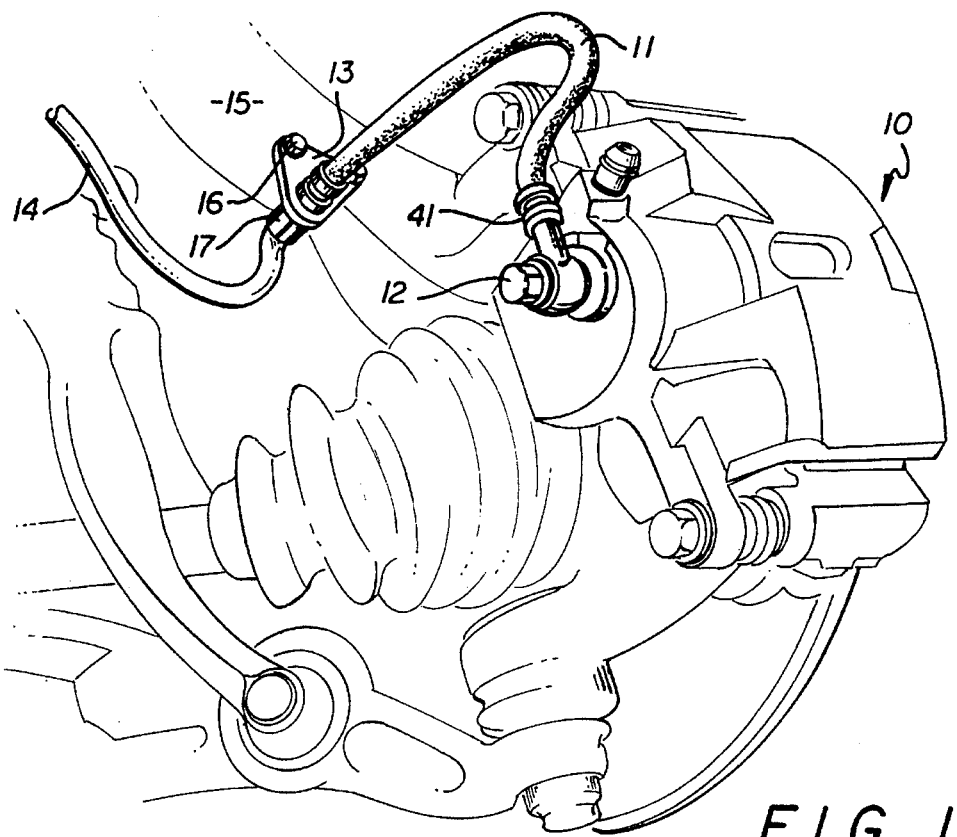
FIG. 1 is a perspective view of a prior art conventional original equipment brake system for a vehicle.

Referring now to FIG. 1 of the drawing, a conventional wheel cylinder or brake caliper 10 is shown. A conventional flexible brake hose 11 of a fabric reinforced elastomeric material is connected to caliper 10 via bolt 12. Hose 11 is coupled to a pre-existing conventional bracket 13 mounted to the vehicle chassis 15 via bolt 16. A steel tube 14 is coupled via connector fitting 17 to bracket 13 and extends to the brake master cylinder (not shown) of the vehicle. Thus, in such a typical installation, hydraulic pressure from the brake master cylinder is transmitted through steel tube 14 to bracket 13 with flexible hose 11 leading to the brake caliper 10. Bracket 13 is conventional and typically includes a threaded connector fitting 17 which clips to the bracket 13 mounted at a convenient location on the vehicle chassis 15.

As discussed hereinabove, efforts to replace elastomeric hose 11 with stainless steel braid protected Teflon flexible hose has led to fatigue failure of the protective braid at the end of the crimp or swedge collar or socket of the hose end fitting followed by fatigue failure of the Teflon flexible hose and resultant loss of pressure.

Thus, as particularly contemplated in the present invention, whip dampening means 18 is shown associated with bracket 13 and a flexible hose 19 of stainless steel braid reinforced extruded Teflon material has replaced hose 11 of FIG. 1. Telfon is a trademark of The Dupont Corp. For a synthetic fluorine-containing resin.

Figure 2:
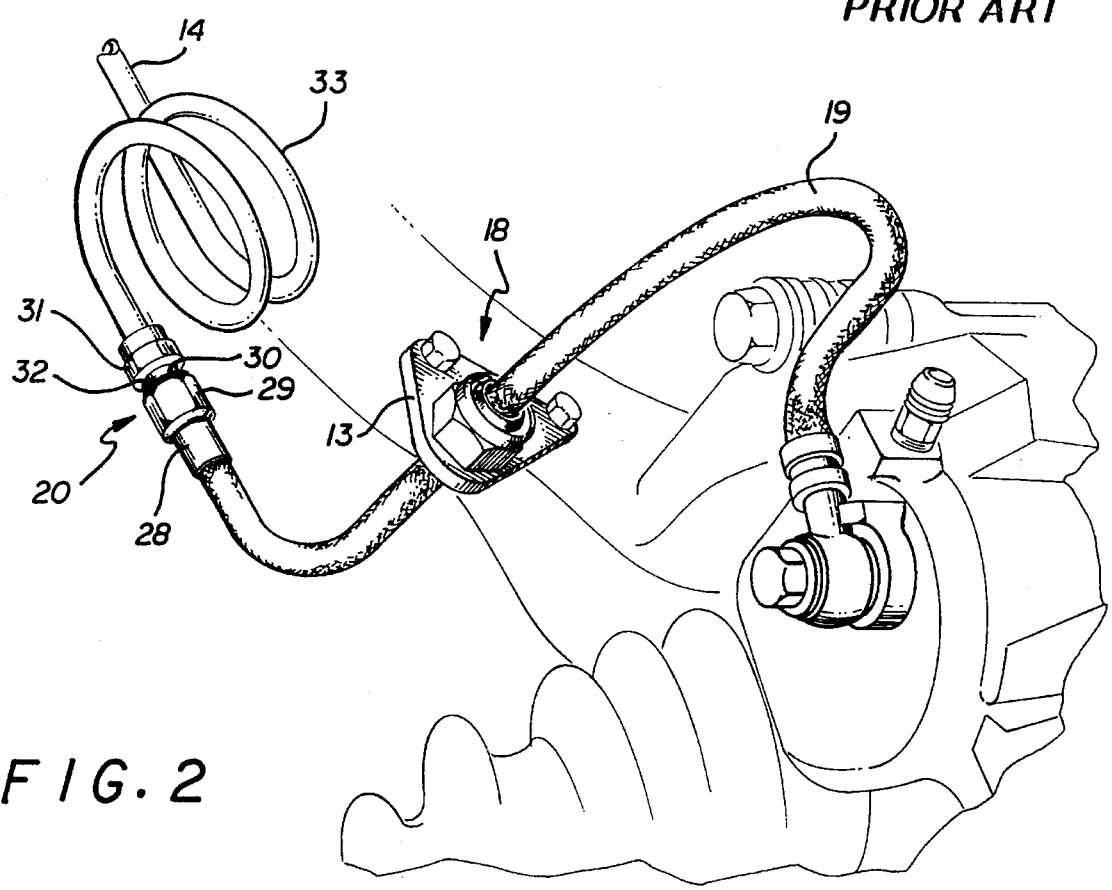
FIG. 2 is a view similar to FIG. 1 showing apparatus in accordance with the teachings of the invention installed between the brake caliper and brake master cylinder of the system of FIG. 1.

Thus, as seen in FIG. 3, hose 19 passes through bracket 13 and may either extend to the master cylinder (not shown), thereby also replacing steel tube 14, or to a connector fitting 20, as seen in FIG. 2. Whip dampening means 18, associated with bracket 13 and hose 19, preferably includes a spherical bearing 21 (FIG. 3) slidably mounted on hose 19 and rotatably mounted in a race 22 mounted in nut assembly 23. Nut assembly 23 has a nut portion 24 with suitable spaced flats 25 (see also FIG. 4) on an integral sleeve portion 26 trapping race 22 therein (crimped at end 27 to accomplish the same). A C-shaped resilient clip 100 snaps into groove 101 in assembly 23 to retain the same to bracket 13.

As seen in FIG. 2, hose 19 may extend to a sleeve 28 of fitting 20 and is crimped thereto. Nut portion 29 has an inner portion insertible on hose 19 with sleeve 28 crimped to this assembly. The pre-existing steel or metal tube 14 usually includes a pre-existing nut 31 having an integral threaded shaft 32. Shaft 32 is then threadably received in nut collar 30. The terminal end of tube 14 is usually enlarged so as to slidably retain tube 14 to nut 31. It is to be understood that tube 14 is hollow as is hose 19 and suitable fluid passages and/or throughbores are provided through fitting 20, nut 31, nut shaft 32 and bearing 21.

Tube 14 is shown in FIG. 2 as looped at loop 33 to shorten the distance between fitting 20 and the vehicle master cylinder (not shown), assembly hose 19 and means 23 does not replace original tube 14.

Bearing 21 may be of any suitable type, such as the spherical bearings manufactured by Align-A-Ball, Aurora Bearing Company, National Bearing Company, Radial Bearing Company, Heim Inc., etc.

In operation, the dynamic misalignment capability provided by bearing 21 and its assembly acts as a whip dampening means for the hose 19. Such an assembly, in testing, far exceeds the fatigue requirement of the DOT as heretofore stated.

Installation of hose 19, whip dampening means 23 and connectors 29, 30-32 is quick and easy. Such installation may be effected in either of two methods:

(1) replacement of the entire original equipment steel tube 14 and hose 11 assembly with an assembly of the stainless steel braid protected Teflon hose 19 of suitable length with suitable end fittings, such as fitting 41 (FIG. 1), such apparatus taking the place of the original equipment connector fitting 17 and secured to the original equipment mounting bracket 13 as shown in FIG. 3. That is, as seen in FIG. 3, hose 19 is crimped to a sleeve 50 having a nut 51 pivotally mounted thereon, nut 51 being threaded on its interior 52. A fitting 53, having opposed male threaded ends 54, 55 and a central integral nut 56 is provided. End 54 is threadably received in interior 52; end 55 is threadably received in the threaded socket 57 of the vehicle master brake cylinder 58. In this manner, hose 19 can be quickly and easily coupled to the brake master cylinder 58; or (2) substitution of the original equipment flexible hose 11 with an assembly of the flexible stainless steel braid protected extruded Teflon hose 19 of suitable length with suitable end fittings 20, 30 the apparatus taking the place of the original equipment 17 (FIG. 1) fastened to the original equipment mounting bracket 13. In this case, the original equipment rigid steel tube 14 must be shortened by careful bending, either into a spiral or into an "S" bend, as seen in FIG. 2, and connected to the flexible hose 19 with a suitable fitting, e.g., fitting assembly 30, 31 (FIG. 3).

The unique features of the invention are two:

(1) the invention allows flexible brake hoses of stainless steel braid protected extruded Teflon hose to pass the whip resistance test of the U.S. Department of Transportation Basic Motor Vehicle Safety Standard 106 Section 56.3, and (2) the invention utilizes whip dampening means which clips into the original equipment attachment bracket 13 via clip 100.

Preferably, such a flexible brake hose assembly includes a stainless steel braid protected extruded Teflon hose. Although a spherical bearing 21 and its related parts has been disclosed for the whip dampening means 23, any suitable means allowing for whipping of hose 19 as it passes through bracket 13 without damaging the same may be used, such as a suitably shaped bushing or an elastic grommet. For example, as seen in FIG. 4, a bushing or grommet 40 of a resilient or elastic material, such as rubber, may be substituted for bearing 21 and race 22, with hose 19 passing therethrough as shown. The hose 19 slides within grommet 40.

The invention can be quickly and easily applied to any pre-existing original equipment bracket. For example, as many as 12 differently sized brackets may be known as original equipment in the vehicle art. A suitable sized bearing assembly or grommet is thus chosen.

I claim:

1. A hose system for the brakes of a vehicle adapted to extend between a brake caliper and a brake master cylinder of the vehicle though a bracket on the vehicle comprising:

a hose; and whip dampening means associated with the bracket of the vehicle, said whip dampening means including a bearing assembly disposed within an opening in said bracket, said bearing assembly having a bearing rotatably mounted within said bearing assembly, said bearing having a hole therein, said hose passing through the hole in said bearing, said bearing assembly being slidably mounted on said hose.

2. In the hose system of claim 1 further including a steel hollow tube having a first end and a second end, the first end is coupled to said brake master cylinder and the second end is coupled to said hose.

3. In the hose system of claim 2 wherein said tube is bent into a loop between said master cylinder and said hose where said tube is coupled to said hose for reducing the distance between said brake master cylinder and said bracket.

4. In the hose system of claim 1 wherein said hose has one end coupled to said brake master cylinder and the other end coupled to said brake caliper.

5. In the hose system of claim 1 wherein said hose is made out of stainless steel braid protected material.

6. A hose system for the brakes of a vehicle adapted to extend between a brake caliper and a brake master cylinder of the vehicle through a bracket on the vehicle comprising:

a hose; and whip dampening means associated with the bracket of the vehicle, said whip dampening means including a resilient member mounted in an opening in said bracket, said resilient member having a hole, said hose passing through the hole of said resilient member, said hose, being slidably mounted along the longitudinal axis within said resilient member.

7. In the hose system of claim 6 wherein said hose is made out of stainless steel braid protected material.

* * * * *